(12) United States Patent
Burgess

(10) Patent No.: US 7,600,945 B2
Burgess
(45) Date of Patent: Oct. 13, 2009

(54) VACUUM FORMED CLADDING

(75) Inventor: Alan Burgess, Blundellsands (GB)

(73) Assignee: Trelleborg CRP Limited, Skelmersdale, Lancashire (GB)

( * ) Notice: Subject to any disclaimer, the term of this patent is extended or adjusted under 35 U.S.C. 154(b) by 184 days.

(21) Appl. No.: 10/571,596

(22) PCT Filed: Sep. 1, 2004

(86) PCT No.: PCT/GB2004/003709

§ 371 (c)(1),
(2), (4) Date: Mar. 26, 2007

(87) PCT Pub. No.: WO2005/026560

PCT Pub. Date: Mar. 24, 2005

(65) Prior Publication Data

US 2007/0231077 A1 Oct. 4, 2007

(30) Foreign Application Priority Data

Sep. 12, 2003 (GB) ................................. 0321404.6

(51) Int. Cl.
*F15D 1/10* (2006.01)
(52) U.S. Cl. ........................ 405/216; 405/211; 114/243
(58) Field of Classification Search ................. 405/211, 405/211.1, 216; 114/243
See application file for complete search history.

(56) References Cited

U.S. PATENT DOCUMENTS

| | | | |
|---|---|---|---|
| 4,171,674 A | 10/1979 | Hale | |
| 5,984,584 A * | 11/1999 | McMillan et al. | 405/211 |
| 6,010,278 A * | 1/2000 | Denison et al. | 405/216 |
| 6,019,549 A | 2/2000 | Blair et al. | |
| 6,048,136 A | 4/2000 | Denison et al. | |
| 6,244,204 B1 | 6/2001 | Weyman | |
| 6,347,911 B1 * | 2/2002 | Blair et al. | 405/216 |
| 6,401,646 B1 | 6/2002 | Masters et al. | |
| 6,561,734 B1 * | 5/2003 | Allen et al. | 405/216 |
| 6,565,287 B2 * | 5/2003 | McMillan et al. | 405/216 |
| 6,695,540 B1 * | 2/2004 | Taquino | 405/216 |

FOREIGN PATENT DOCUMENTS

| | | | |
|---|---|---|---|
| GB | 2335248 A | 9/1999 | |
| WO | 8002476 A1 | 11/1980 | |
| WO | 0061433 A1 | 10/2000 | |
| WO | 0240821 A1 | 5/2002 | |

* cited by examiner

*Primary Examiner*—Frederick L Lagman
(74) *Attorney, Agent, or Firm*—Rothwell, Figg, Ernst & Manbeck, P.C.

(57) ABSTRACT

A cladding section for mounting upon an elongate member and suppressing vortex induced vibration of it, the cladding section being formed of plastics sheet shaped to define two or more parallel, part tubular portions having respective vortex induced vibration suppression features, material joining neighboring part tubular sections being sufficiently pliant to allow the cladding section to be re-configured from a quasi-flat state to a state in which it forms a tube for receiving the elongate member. Also disclosed is a method of manufacturing a cladding section for mounting upon an elongate underwater member and suppressing vortex induced vibration of it, the method including thermoforming the cladding section in one piece.

11 Claims, 2 Drawing Sheets

VACUUM FORMED CLADDING

CROSS-REFERENCE TO RELATED APPLICATION

This application is a National Phase of International Application Serial No. PCT/GB2004/003709, filed 1 Sep. 2004.

BACKGROUND OF THE INVENTION

1. Field of the Invention

The present invention relates to a cladding for suppressing vortex induced vibration of underwater pipes, cables or other elongate members.

2. Description of the Background Art

When water flows past an underwater pipe, cable or other elongate member, vortices may be shed alternately from either side. The effect of such vortices is to apply fluctuating transverse forces to the member. Such forces can cause the member to bend more than is desirable and impose unwanted additional forces on the member's point of suspension. If the shedding frequency of the vortices is close to a natural frequency of the member then resonance effects can result in particularly severe and potentially damaging oscillation. The problem is experienced particularly in connection with marine risers of the type used in sub-sea oil drilling and extraction. It is referred to as "vortex induced vibration" or "VIV".

It is known to apply to elongate underwater members a cladding whose exterior is shaped to suppress VIV. Reference is directed in this regard to UK patent application No. 9905276.3 (publication No. 2335248) which discloses an underwater cladding made up of a number of separately formed sections assembled to form a tubular structure receiving an underwater member and having sharp edged helical strakes along its length which, by controlling transition from laminar to turbulent in a flow of water on the structure, serve to suppress VIV. The sections are moulded from polyurethane and are semi-tubular, a facing pair of such sections being assembled around the underwater member to surround it.

The cladding has proved itself in practice to be highly effective. However there are commercial pressures to produce a unit which is more economical in manufacture than the existing polyurethane cladding. Additionally the existing cladding has moderately thick walls which add to its mass and also to the area it presents to a flow, so that drag is increased. Reducing the mass and frontal area are desirable.

SUMMARY OF THE INVENTION

In accordance with a first aspect of the present invention there is a cladding section for mounting upon an elongate member and suppressing vortex induced vibration of it, the cladding section being formed of plastics sheet shaped to define two or more parallel, part tubular portions having respective vortex induced vibration suppression features, material joining neighbouring part tubular portions being sufficiently pliant to allow the cladding section to be re-configured from a quasi-flat state to a state in which it forms a tube for receiving the elongate member.

In accordance with a second aspect of the present invention there is a method of manufacturing a cladding section for mounting upon an elongate underwater member and suppressing vortex induced vibration of it, the method comprising thermoforming the cladding section in one piece.

BRIEF DESCRIPTION OF THE DRAWINGS

Specific embodiments of the present invention will now be described, by way of example only, with reference to the accompanying drawings, in which.

DETAILED DESCRIPTION OF THE INVENTION

The illustrated cladding section 10 is manufactured from plastics sheet by a thermoforming technique and more specifically by vacuum forming. When installed upon an elongate underwater member (not shown) such as a marine riser, the cladding section 10 forms a tubular sheath 12 extending all the way around the circumference of the member and having longitudinally extending, upstanding strakes 14, 14', 14". These are inclined to the axis of the sheath 12.

Figure 3:
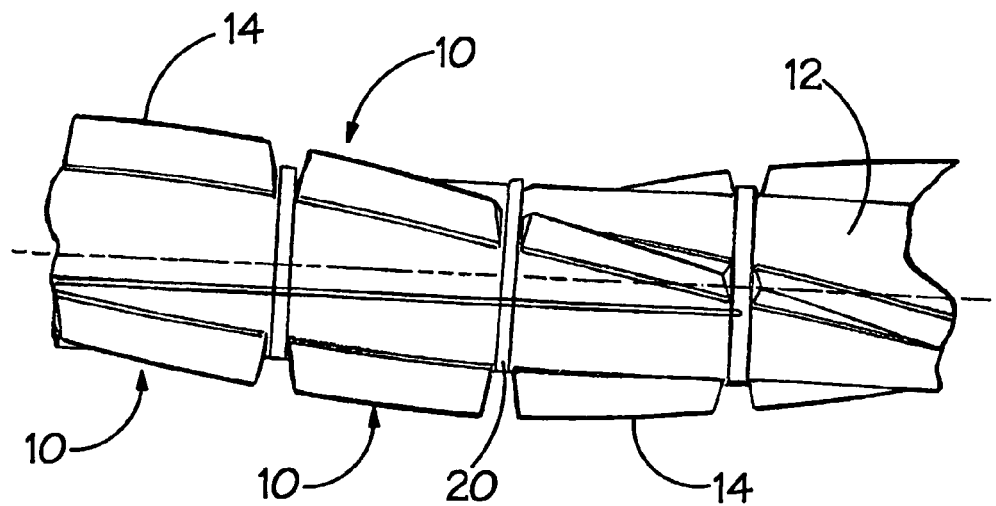
FIG. 3 is a side view showing a string of such cladding sections mounted for use.

In use (FIG. 3) numerous cladding sections 10 are placed end-to-end in a string and their strakes 14 together form shallow pitched helices along the length of the underwater member. In the present embodiment three strakes are used and are regularly circumferentially spaced, so that the helical lines of strakes are configured in the manner of a triple start screw thread. The result is that the cladding is omnidirectional, in the sense that it serves to suppress vortex induced vibration equally effectively for any direction of flow.

The strakes each have an exposed vertex 16 which tends to "trip" flow over the cladding—i.e. to promote the transition from laminar to turbulent flow. The resulting controlled transition from laminar to turbulent flow typically does not give rise to vortex induced vibration. The illustrated strakes are of triangular cross section and are hollow, as a result of the thermoforming process.

The cladding section 10 is shaped to mate with neighbouring, similarly formed sections in a string. In the illustrated example this mating is achieved by virtue of a "joggle"—an enlarged diameter portion 18 of the tubular sheath 12 which is internally sized to receive the opposite (non-enlarged) end of the neighbouring cladding section. A tension band 20 (FIG. 3) is then placed around the enlarged diameter portion 18 serving to secure the sections in place around the elongate member and to secure the two cladding sections together. The enlarged diameter portion 18 is cut away at 19, 19', 19" to allow it to be deformed radially inwardly under pressure from the tension band.

The cladding section is also provided with indexing features serving to control the relative angular positions of neighbouring sections and hence to ensure that their strakes align to form a continuous helical line. In the illustrated embodiment these take the form of cut-aways 22, 22', 22" which receive ends of the helical strakes of the neighbouring section and so define the relative annular positions of the sections.

Figure 1:
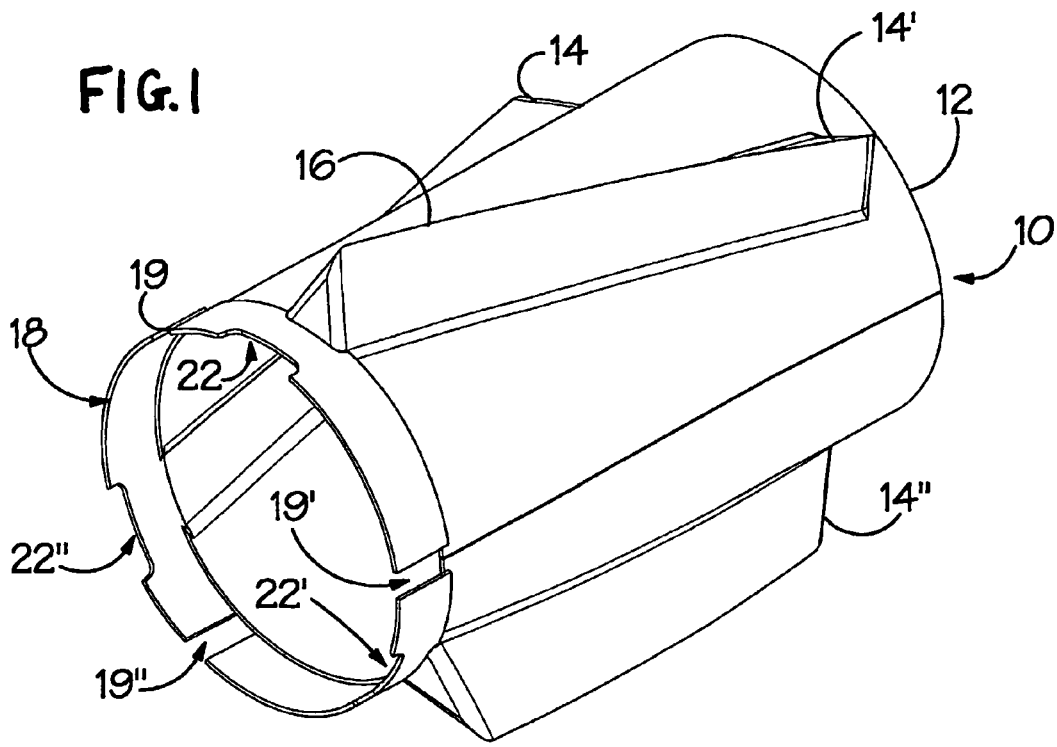
FIG. 1 is a perspective illustration of a section of cladding embodying the present invention.
Figure 2:
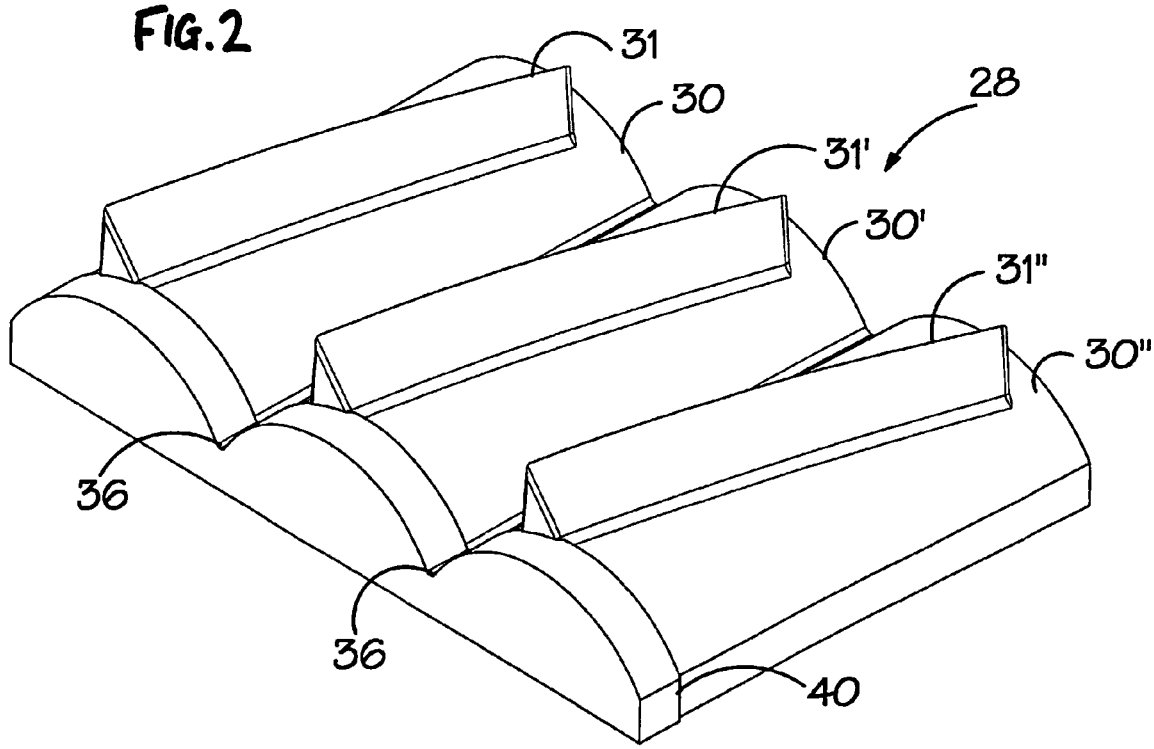
FIG. 2 is a perspective illustration of a mould used in manufacture of the cladding section.

The cylindrical shape seen in FIG. 1 is not well suited to thermoforming. Instead the form tool or mould 28 seen in FIG. 2 is used, having three co-planar part cylindrical portions 30, 30', 30" which are parallel and separated from their neighbour by a short distance at 36. Each part cylindrical portion carries a projection 31, 31', 31" to form a respective strake. This formation of the mould allows for easy release of the thermoformed cladding section. The overall length of the section is however limited in relation to the pitch of the helix of the strakes, since too large an angular difference between one end of the strake and the other would result in the mould being undercut, creating difficulties in the thermoforming process and/or in release from the mould. Note that one end of the mould 28 is stepped at 40 to form the enlarged diameter portion 18.

Upon removal from the mould, the upper surface of the cladding section 10 has of course very much the same shape as the upper surface of the mould 28. Because of the presence of the inclined strakes 14, 14', 14", each of the part-cylindrical portions of the section tends to retain its shape. However strips of material joining these portions (corresponding to the regions 36 of the mould) act as flexible hinges allowing the three part cylindrical section to be rotated relative to each other and so arranged to form together a complete cylinder as seen in FIG. 1.

The actual process of vacuum forming is very well known. The product is formed from plastics sheet which is rendered formable by heating and then drawn against the mould surface by creation of a partial vacuum between the mould and the plastics sheet. Vacuum holes are required in the mould 28. These are not shown in FIG. 2 but their formation is conventional.

The material used for prototype cladding sections, and considered well suited to production versions, is polyethylene sheet although other thermoplastic sheet materials may be used. A sheet thickness of just 3 mm. has been found adequate. The result is a light, economical product. Due to the thin material used the cladding does not add greatly to the elongate member's frontal area and hence to the drag it experiences in a flow. The cladding sections are highly compact to store prior to deployment since they can be closely stacked one upon the other.

Polyethylene has a density similar to that of water so that the cladding sections are approximately neutrally buoyant.

The thermoforming technique permits the cladding section to be built up of multiple layers in a sandwich. In particular it is envisaged that the section may have an outer layer of anti-fouling material upon an inner structural layer e.g. of polyethylene, providing protection against marine fouling without use of excessive quantities of expensive anti-fouling material. This can be achieved by using in the vacuum forming process an initially flat polymer sheet comprising at least two different layers, with the anti-fouling material confined to chosen layers. For example an existing prototype has an outer layer of polymer (polyethylene) material impregnated with cuprous anti-fouling compound upon a thicker structural layer of polymer without the anti-fouling. An alternative would be to provide an anti-fouling layer on both faces of an interior structural layer. Multi-layered sheets of this type can be formed by the well known process of co-extrusion.

Figure 4:
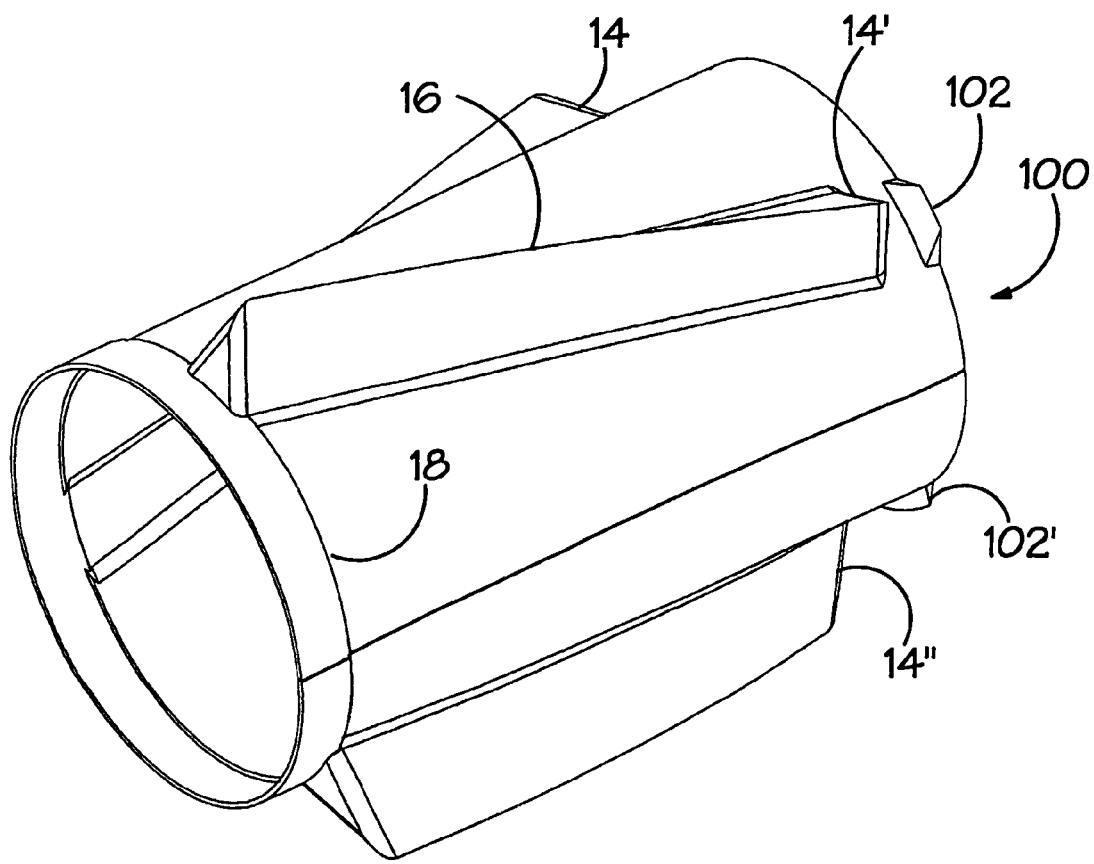
FIG. 4 is a perspective illustration of a further section of cladding embodying the present invention.

FIG. 4 illustrates a second cladding section embodying the present invention. In many respects this is similar to the cladding section seen in FIG. 1. Like parts are given the same reference numerals in the two drawings and only the distinctions of the second section from the first will be described.

The cladding section 100 illustrated in FIG. 4 lacks the cut aways 19 and 22 of the first cladding section 10. Manufacture is simplified since it is not necessary to shape the end of the thermoplastic sheet. Relative positioning of neighbouring cladding sections in a string is provided for by virtue of shaped stubs 1021 1021 (a third stub is also provided but is not seen in the drawing). To engage one section 100 with its neighbour, the joggle 18 of a first cladding section is passed over the stubs 102 of a second, thereby positioning the stubs of the second within respective strakes 14 of the first. The stubs 102 are shaped to fit within the strakes. Once a tension band has been placed around the joggle 18, the stubs serve to securely locate the two cladding sections, preventing relative rotational and axial displacement of them.

Claddings constructed as described have been found to be several times lighter than equivalent polyurethane products. The thin walls and hollow strakes of the present cladding contributes to this weight reduction. As a consequence of its low weight, the present cladding is easy to handle and install.

The invention claimed is:

1. A cladding section for mounting upon an elongate member and suppressing vortex induced vibration of the elongate member, the cladding section being a unitary component formed of a single thermoformed plastics sheet shaped to define two or more parallel, part tubular portions each having a part tubular outer surface and a respective vortex induced vibration suppression strake upstanding from said outer surface, portions of the unitary component joining neighboring part tubular portions being sufficiently pliant to allow the unitary component to be re-configured from a quasi-flat state to a state in which the unitary component is a tube for receiving the elongate member.

2. A cladding section as claimed in claim 1 which is a unitary thermoformed component.

3. A cladding section as claimed in claim 1 which is a unitary vacuum formed component.

4. A cladding section as claimed in claim 1 the vortex induced vibration suppression feature is a hollow projection.

5. A cladding section as claimed in claim 4 wherein the feature is an elongate hollow strake.

6. A cladding section as claimed in claim 1 wherein the part tubular sections are at least semi-rigid due to their shape.

7. A cladding section as claimed in claim 1 comprising an outer layer of anti-fouling material and an inner structural layer.

8. A cladding section as claimed in claim 1 which is provided with a mating feature for mating with a longitudinally adjacent cladding section.

9. A method of manufacturing a cladding section for mounting upon an elongate underwater member and suppressing vortex induced vibration of the elongate member, the method comprising thermoforming a single plastics sheet to form a unitary component having two or more parallel, part tubular portions each having an outer surface and a respective vortex induced vibration suppression strake upstanding from said outer surface, portions of the unitary component being sufficiently pliant to allow the unitary component to be re-configured from a quasi-flat state to a state in which the unitary component is a tube.

10. A method as claimed in claim 9 comprising thermoforming the cladding section in a mould tool having two or more adjacent parallel part cylindrical sections each carrying features shaped to form respective vortex induced vibration suppression features.

11. A method as claimed in claim 9 further comprising forming a sheet used in the thermoforming process by co-extrusion to create a sheet which has an anti-fouling layer upon a structural layer of polymer.

* * * * *